United States Patent
Cole et al.

(10) Patent No.: US 10,378,415 B2
(45) Date of Patent: Aug. 13, 2019

(54) DIAGNOSTIC AND MITIGATION STRATEGY FOR REDUCTANT INJECTOR OBSTRUCTION IN EXHAUST SYSTEM

(71) Applicant: Caterpillar Inc., Peoria, IL (US)

(72) Inventors: Brian Cole, Chisago City, MN (US); Sanket Yeole, Peoria, IL (US); Darin McCoy, East Peoria, IL (US); Johnathan Trundt, Peoria, IL (US); Wayne Davey, Spalding (GB)

(73) Assignee: Caterpillar Inc., Deerfield, IL (US)

( * ) Notice: Subject to any disclaimer, the term of this patent is extended or adjusted under 35 U.S.C. 154(b) by 44 days.

(21) Appl. No.: 15/690,929

(22) Filed: Aug. 30, 2017

(65) Prior Publication Data
US 2019/0063296 A1    Feb. 28, 2019

(51) Int. Cl.
*F01N 3/20* (2006.01)
*B01D 53/90* (2006.01)
(Continued)

(52) U.S. Cl.
CPC .............. *F01N 11/00* (2013.01); *B01D 53/90* (2013.01); *B01D 53/9418* (2013.01); *F01N 3/208* (2013.01); *F01N 2550/05* (2013.01); *F01N 2610/02* (2013.01); *F01N 2610/144* (2013.01); *F01N 2610/1406* (2013.01);
(Continued)

(58) Field of Classification Search
CPC ...... F01N 11/00; F01N 3/208; F01N 2550/05; F01N 2900/0418; F01N 2900/1808; F01N 2900/1812; F01N 2900/1821; F01N 2610/02; F01N 2610/1406; F01N 2610/144; F01N 2610/146; F01N 2900/0408; F01N 2900/0412; F01N 2900/1631; F01N 2900/1811; F01N 2900/1822; Y02T 10/24; Y02T 10/47; B01D 53/90; B01D 53/9418
See application file for complete search history.

(56) References Cited

U.S. PATENT DOCUMENTS 8,387,366 B2    3/2013  Ohno
8,776,503 B2    7/2014  Wang et al.
(Continued)

FOREIGN PATENT DOCUMENTS

EP    2131021 A1    12/2009
EP    2585692 B1    5/2013
(Continued)

OTHER PUBLICATIONS

European Patent Office Search Report for Application No. 181881148.6-1004, dated Nov. 27, 2018.

*Primary Examiner* — Brandon D Lee
(74) *Attorney, Agent, or Firm* — Jonathan F. Yates (57) ABSTRACT

A reductant delivery system includes an electronic control unit coupled with each of an electronically controlled reductant injector and an electronically controlled pump, and structured to mitigate obstruction of a reductant injector in an exhaust system of an engine. The electronic control unit is further structured to receive data indicative of a pump duty cycle, and calculate a diagnostic value based on pump duty cycle associated with injection of different amounts of reductant, compare the diagnostic value with a threshold value, and output an error signal to trigger an obstructed-injector mitigation action.

19 Claims, 4 Drawing Sheets

(51) Int. Cl.
  *B01D 53/94* (2006.01)
  *F01N 11/00* (2006.01)
(52) U.S. Cl.
  CPC  *F01N 2610/146* (2013.01); *F01N 2900/0408* (2013.01); *F01N 2900/0412* (2013.01); *F01N 2900/1631* (2013.01); *F01N 2900/1808* (2013.01); *F01N 2900/1811* (2013.01); *F01N 2900/1821* (2013.01); *F01N 2900/1822* (2013.01)

(56) References Cited

U.S. PATENT DOCUMENTS

2012/0067031 A1* 3/2012 Wang ............... F01N 3/208
  60/277
2012/0286063 A1 11/2012 Wang et al.
2013/0186073 A1* 7/2013 Onodera ............ F01N 3/208
  60/277

FOREIGN PATENT DOCUMENTS

| EP | 2660437 A1 | 11/2013 |
| FR | 2970749 A1 | 7/2012 |
| JP | 2011149366 A | 8/2011 |
| WO | 2011161175 A1 | 12/2011 |
| WO | 2014134273 A1 | 9/2014 |

* cited by examiner

| Z Threshold Values | Y Temperature | | | |
|---|---|---|---|---|
| | -10 | 25 | 50 | 70 |
| 100 | # | # | # | # |
| 75 | # | # | # | # |
| 50 | # | # | # | # |
| 25 | # | # | # | # |
| 10 | # | # | # | # |

DIAGNOSTIC AND MITIGATION STRATEGY FOR REDUCTANT INJECTOR OBSTRUCTION IN EXHAUST SYSTEM

TECHNICAL FIELD

The present disclosure relates generally to engine exhaust treatment, and more particularly to diagnosing obstruction of a reductant injector in an engine exhaust system.

BACKGROUND

Internal combustion engines are well known and widely used to produce electrical energy, propulsion power for vehicles on land, sea and air, and in a variety of other applications where rotational torque is used such as pumps, compressors, and conveyors. In recent decades engineers have sought to reduce the amounts of certain constituents of engine exhaust. Depending upon the engine type, application, operating environment, jurisdictional requirements, and other factors the exhaust constituents or emissions of interest include oxides of nitrogen, collectively referred to as "NOx," particulate matter in the nature of soot and ash, carbon monoxide, and even unburned hydrocarbons. In modern compression ignition diesel engines removal strategies for NOx and particulate matter have often proven challenging to implement without significant cost and/or complexity.

Various chemical and physical "traps," filters, and catalysts have been developed that assist in removing undesired emissions from an engine exhaust stream. Other attempts at limiting or eliminating certain emissions have focused on operation of the engine system producing the exhaust, including post-injection strategies, variable geometry turbines or waste gates, and still others. In recent years, a mechanism known as a selective catalytic reduction or "SCR" module has been developed which is coupled with or integrated into an engine exhaust system and, among other things, includes apparatus for injecting a reductant in a liquid form into the exhaust stream. Liquid reductants commonly used include so-called urea water or more generally diesel exhaust fluid or DEF, and sometimes hydrocarbon fuel. Reductant injection is used in an SCR module, or otherwise, to reduce NOx according to well-characterized chemical pathways.

While urea injection systems and the like have proven successful, they are not without problems. For example, it has been observed that reductant injectors or "dosing valves" positioned within and subjected to exhaust stream conditions can clog with solid deposits. Limits on the available flow area for a reductant injector can render the associated NOx reduction control techniques less effective or less efficient. United States Patent Application Publication No. 2012/0286063 to Wang et al. is directed to Urea Injector Diagnostics Using Spectral Analysis. Wang et al. propose indicating an injector fault in a urea dosing module by monitoring a control command for the urea dosing module, determining a carry frequency for the control command, and then evaluating line pressure at the carry frequency to indicate an injector fault. While Wang et al. and others evidence some development in the art of urea dosing module diagnostics, there is ample room for superior and alternative techniques.

SUMMARY OF THE INVENTION

In one aspect, a reductant delivery system for treating emissions in an engine exhaust system includes an electronically controlled reductant injector structured for coupling with an exhaust conduit in an exhaust system, and an electronically controlled pump coupled with the electronically controlled reductant injector. The system further includes an electronic control unit coupled with each of the electronically controlled reductant injector and the electronically controlled pump, the electronic control unit being structured to receive data indicative of a pump duty cycle of the electronically controlled pump in each of a plurality of monitoring periods, and calculate a diagnostic value based on a difference between a pump duty cycle and a first one of the plurality of monitoring periods where a first amount of a reductant is injected, and a second one of the plurality of monitoring periods where a second amount of the reductant is injected. The electronic control unit is further structured to compare the diagnostic value with a threshold value, and output an error signal indicative of obstruction of the reductant injector based on the comparing of the diagnostic value with the threshold value.

In another aspect, a method of mitigating obstruction of a reductant injector in an exhaust system of an internal combustion engine includes monitoring a duty cycle of a reductant injector structured to couple with an exhaust conduit in the exhaust system, and monitoring the duty cycle of a pump operated to supply a reductant to the reductant injector. The method further includes calculating a diagnostic value based on a difference between a duty cycle of the pump in a first one of a plurality of monitoring periods where a first amount of reductant is delivered into the exhaust conduit, and a duty cycle of the pump in a second one of the plurality of monitoring periods where a second amount of a reductant is delivered into the exhaust conduit. The method further includes outputting an error signal based on the diagnostic value, and triggering an obstructed-injector mitigation action in response to the error signal.

In still another aspect, an exhaust system for an internal combustion engine includes a reductant tank, an exhaust conduit, an electronically controlled reductant injector coupled with the exhaust conduit, and an electronically controlled pump structured to supply a reductant from the reductant tank to the electronically controlled reductant injector. The system further includes an electronic control unit coupled with each of the electronically controlled reductant injector and the electronically controlled pump. The electronic control unit is structured to receive data indicative of a duty cycle of the electronically controlled reductant injector, and data indicative of a duty cycle of the electronically controlled pump. The electronic control unit is further structured to calculate a diagnostic value based on a difference between a duty cycle of the electronically controlled pump in a first one of a plurality of monitoring periods where a first amount of reductant is delivered into the exhaust conduit, and a duty cycle of the electronically controlled pump in a second one of the plurality of monitoring periods where a second amount of a reductant is delivered into the exhaust conduit. The electronic control unit is further structured to compare the diagnostic value with a threshold value, output an error signal based on the comparing of the diagnostic value with a threshold value, and trigger an obstructed-injector mitigation action in response to the error signal.

DETAILED DESCRIPTION

Figure 1:
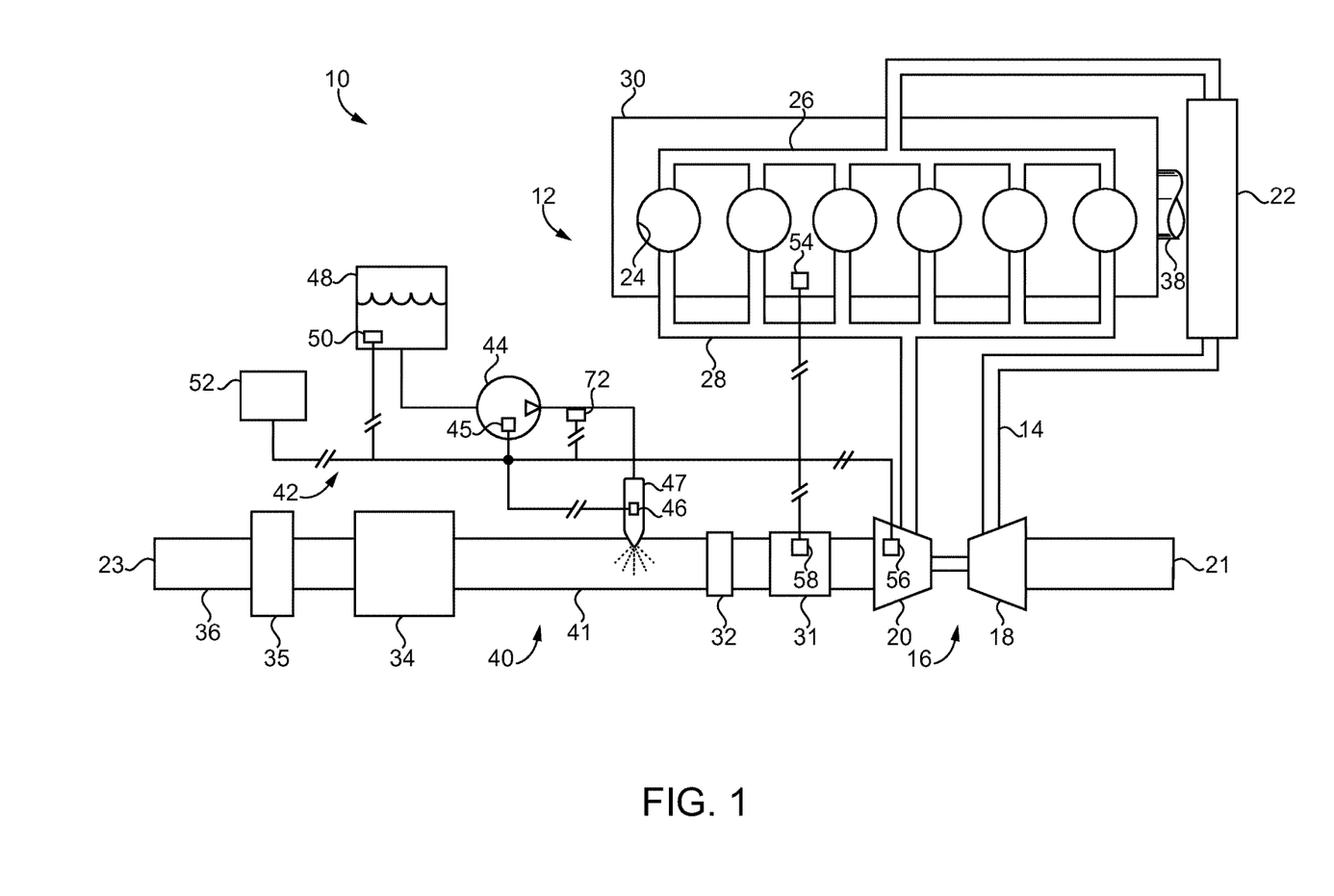
FIG. 1 is a diagrammatic view of an engine system including a reductant delivery system, according to one embodiment.

Referring to FIG. 1, there is shown an internal combustion engine system 10 (hereinafter "engine system 10"), according to one embodiment and including an engine 12 having an engine housing 30 with a plurality of combustion cylinders 24 formed therein. Combustion cylinders 24 will be equipped with reciprocating pistons structured to rotate a crankshaft 38 in a generally conventional manner. Engine system 10 may include a compression ignition internal combustion diesel engine, where a mixture of fuel and air is compressed to an autoignition threshold in combustion cylinders 24, and structured to operate on a variety of fuels such as diesel distillate fuel, biodiesel, and others. An air inlet 21 to an intake conduit 14 feeds intake air for combustion to an intake manifold 26, with the intake air being compressed by way of a compressor 18 in a turbocharger 16 and cooled by way of an aftercooler 22. An exhaust manifold 28 receives exhaust from combustion of the intake air with fuel and feeds the exhaust from engine housing 30 through a turbine 20 of turbocharger 16, and into an exhaust conduit 41 in an exhaust system 40. Engine 12 may be direct-injected, although the present disclosure is not thereby limited.

Exhaust system 40 may include a plurality of aftertreatment elements 31, 32, 34, and 35 associated with an exhaust conduit 41. In one embodiment aftertreatment element 32 could include a diesel oxidation catalyst or DOC and aftertreatment element 34 could include a selective catalytic reduction module. Aftertreatment element 35 may be positioned downstream of aftertreatment element 34, and could include a diesel particulate filter or DPF. Aftertreatment element 31 could include a filter regeneration mechanism, such as a so-called continuous regeneration system, positioned upstream of aftertreatment element 32. Embodiments are contemplated with different arrangement and composition of aftertreatment elements, including embodiments where no continuous regeneration system or analogous mechanism is provided, filterless designs, and still others.

Engine system 10 further includes components and mechanisms operating in conjunction with or as part of exhaust system 40, including a reductant delivery system 42, for exhaust treatment and emissions reduction. Reductant delivery system 42 can include an electronically controlled reductant injector or dosing valve 46 structured for positioning at least partially within exhaust conduit 41 in exhaust system 40, and an electronically controlled pump 44 coupled with electronically controlled reductant injector 46 and structured to supply a reductant from a reductant tank 48 to electronically controlled reductant injector 46. Electronically controlled reductant injector 46 (hereinafter "injector 46") can include an electronic control element 47, such as an electrical actuator in the nature of a solenoid. Another electronic control element such as a linear electrical actuator, or an electronically controlled hydraulic or pneumatic actuator, or still some other mechanism within or upstream of reductant injector 46 might be used to control opening and/or closing of a valve (not shown) that admits liquid reductant such as urea water or potentially even liquid hydrocarbon fuel into exhaust conduit 41. Electronically controlled pump 44 (hereinafter "pump 44") also includes an electronic control element 45 which could include an electrical actuator such as an electric motor structured to cause rotation or reciprocation of pumping elements within pump 44.

Reductant delivery system 42 further includes an electronic control unit 52 coupled with each of reductant injector 46 and pump 44. Reductant delivery system 42 may also include various monitoring and/or sensing components structured to produce data processed and acted upon by electronic control unit 52 for purposes further discussed herein. To this end, reductant delivery system 42 can include a temperature sensor 50 coupled with or positioned within reductant tank 48 and structured to produce data indicative of a temperature of reductant within reductant tank 48. As viscosity of reductants such as urea water and the like can vary with temperature, information as to temperature can be advantageously exploited within the present context as will be further apparent from the following description. Reductant delivery system 42 can also include a pressure sensor 72 positioned fluidly between pump 44 and reductant injector 46, or within pump 44, to produce data indicative of a fluid pressure of the reductant being supplied for injection/dosing into exhaust conduit 41. Reductant delivery system 42, or engine system 10 more generally, can also include a fueling actuator 54 or other fueling control element, a turbine waste gate or variable geometry turbine actuator 56, for instance, and/or a fueling delivery device actuator 58 coupled with aftertreatment element 31 or otherwise within exhaust system 40.

Each of components 54, 56 and 58 could be controlled by way of control commands produced by electronic control unit 52, or another electronic control unit, to initiate and execute a mitigation action to affect temperature, for example, of the stream of gases conveyed past reductant injector 46 within exhaust conduit 41. Those skilled in the art will appreciate that varying fuel injection timing, adjusting a variable geometry turbine, adjusting a turbine waste gate, injecting fuel into the exhaust stream, or various other techniques could be used to increase a temperature of exhaust gases to burn off, vaporize, or otherwise address accumulated deposits of urea or urea-derived material that might clog or otherwise obstruct nozzle openings in a tip of reductant injector 46.

While it has been recognized that various techniques such as engine thermal management, and high-flow reductant delivery to spray maximum reductant through a reductant injector, can be used to clear or at least partially clear an obstructed reductant injector, such obstruction conditions have proven difficult to detect. In a common application, a reductant delivery pump is closed loop controlled, such as PID controlled, to system pressure. Operation of the reductant injector will generally be open loop, relying upon factors such as a valve opening time and a valve closing time, a valve open duration, or other factors to produce a desired dose of reductant. If an amount of reductant that is injected is insufficient, such as where the reductant injector is obstructed, then NOx conversion can be negatively impacted. Since there is no common or generally practicable direct way to detect reductant injector obstruction in such systems, diagnostic faults that can be triggered when a reductant injector is obstructed typically do not identify the root cause of the problem, and cannot be cleared at least without manual intervention such as disassembly of the exhaust system, or other undesirable, expensive, or labor-intensive mitigation techniques. The present disclosure reflects insights as to the relationship between reductant injector duty cycle and pump duty cycle that can be exploited in an improved diagnostic strategy for reductant injector obstruction as well as mitigation.

Figure 2:
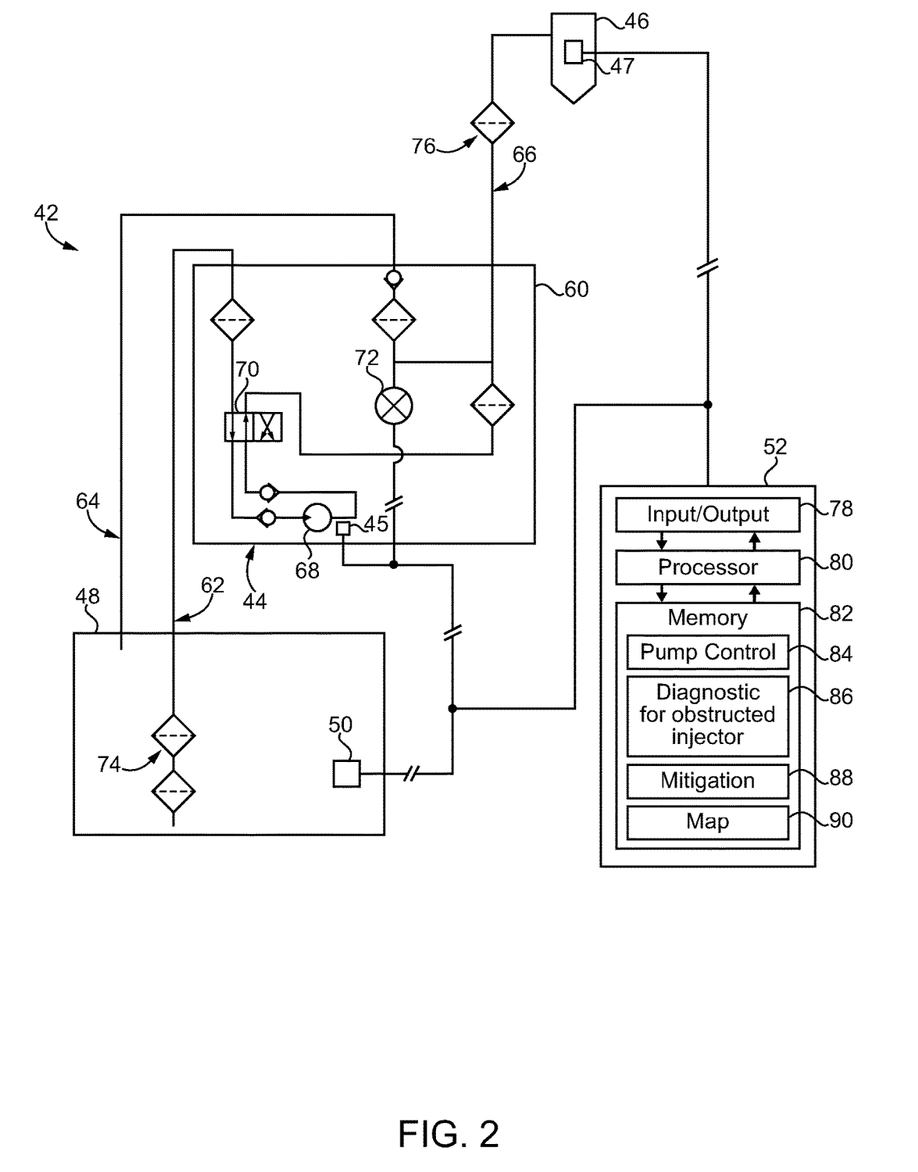
FIG. 2 is a schematic illustration of a reductant delivery system, according to one embodiment.

Referring now also to FIG. 2, there are shown additional details of reductant delivery system 42, including a pump housing 60 having a pumping element 68 of pump 44 therein, as well as a control valve 70 for selectively connecting pumping element 68 to a supply line 66 that feeds reductant to reductant injector 46. Also within pump housing 60 is shown pressure sensor 72 and electronic control element 45. It will be appreciated that these and other components, including components such as filters and additional valves (neither numbered), and still other mechanisms can be provided within a pump housing. Alternatively, such components could be positioned outside of a pump housing. A supply line 62 supplies reductant from reductant tank 48 to pump housing 60, and a return line 64 enables returning pumped reductant from pump 44 back to reductant tank 48. It will be recalled that pump 44 can be controlled in a closed-loop fashion based on data produced by pressure sensor 72, for example, such that a desired pressure of reductant is available by way of supply line 66 more or less at all times. Where reductant injector 46 is obstructed, pump 44 may have to operate less frequently to maintain the desired pressure. Duty cycle can be understood as the relative amount of time that a mechanism is operating. Duty cycle of pump 44 can therefore be expected to be a consistent proportion or percentage for a given set of conditions where reductant injector 46 is not obstructed. Where reductant injector 46 is obstructed, however, the duty cycle of pump 44 that is observed may be less than expected since less pressure loss will occur with the reduced flow of reductant with each scheduled dosing. The difference between the expected duty cycle and the actual or observed duty cycle of pump 44 can be exploited within the present context along with other factors to detect when reductant injector 46 is obstructed.

Also shown in FIG. 2 are filters 74 within reductant tank 48 and at least one filter 76 fluidly between pump 44 and reductant injector 46 within supply line 66. It will also be recalled that filters may be within pump housing 60. In addition to the observation that pump duty cycle can be less than expected where reductant injector 46 is obstructed, the present disclosure also reflects the insights that pump performance can vary based upon a state of filter loading and a state of wear of pump 44, and that these factors can be corrected for when diagnosing an obstructed reductant injector based upon a pump duty cycle less than expected. It can be expected that pump wear state or aging state, and filter loading, may be positively correlated with pump duty cycle, depending upon pump design and filter arrangement and configuration although the present disclosure is not thereby limited. Embodiments are contemplated where the correlation is determined empirically.

The present disclosure further reflects the insights that certain operating conditions can produce data as to duty cycle that is more reliable or more distinctive than other operating conditions, improving generally over other diagnostic strategies that attempt to evaluate pump operation or duty cycle with little or no consideration of particular conditions or states of the system. As will be further apparent from the following description, the pump duty cycle data that is acted upon can include pump duty cycle data associated with different injection amounts of reductant. In an implementation, the pump duty cycle data that is considered can be pump duty cycle data associated with extremes of operation, such as where a relative minimum amount of reductant is injected in a first one of a plurality of monitoring periods versus where a relative maximum amount of reductant is injected in a second one of a plurality of monitoring periods. Electronic control unit 52 can determine the monitoring periods associated with pump duty cycle data of interest based on reductant amount that is intended to be injected in those monitoring periods as indicated by the corresponding average injector duty cycles, and as further discussed herein.

FIG. 2 also illustrates additional structure and configuration of electronic control unit 52, including an input/output interface 78 structured for receiving inputs from various sensors of reductant delivery system 42, or from another electronic control unit, as well as outputting control signals to various electronically controlled mechanisms of reductant delivery system 42 and possibly also other parts of engine system 10. Electronic control unit 52 could include an engine control unit or a control unit dedicated to operation of reductant delivery system 42. Electronic control unit 52 also includes a processor 80 which can include any suitable computer processor such as a microprocessor, a microcontroller, a field programmable gate array or FPGA, or still another computer. Processor 80 is coupled with a memory that can include RAM, ROM, DRAM, SDRAM, FLASH, a hard drive, or another type of memory and that stores computer executable instructions as well as data structures thereon. In the illustrated embodiment memory 82 includes a plurality of software modules or control routines, illustrated as separate modules but which could be integrated into a single module. In particular, a pump control module is shown at 84, a diagnostic for obstructed injector module is shown at 86, and a mitigation module is shown at 88. A map further discussed herein is shown at 90. Module 84 could be the closed-loop control software for turning on and turning off pumping element 68, or otherwise varying a pumping output of pump 44. Diagnostic module 86 could include control software for running diagnostics on reductant delivery system 42 with respect to reductant injector obstruction as discussed herein, and mitigation module 88 could include control software for taking action where an obstructed state of reductant injector 46 is diagnosed. Map 90 may be configured for enabling looking up a threshold value for the obstructed injector diagnostics, as further described herein. Those skilled in the art will appreciate that a variety of different configurations of electronic control unit 52 are possible, as well as distribution of the control functions among multiple control units, omission of some of the control functions or addition of others.

Figure 5:
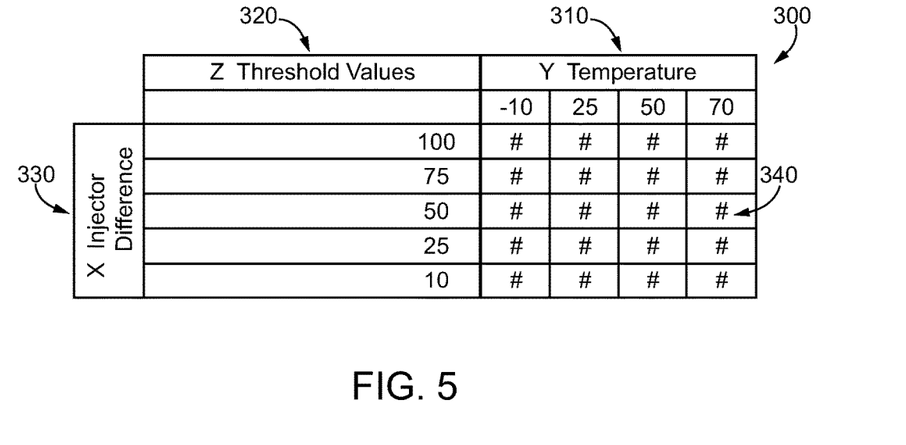
FIG. 5 is a chart illustrating an example map configuration.
Figure 6:
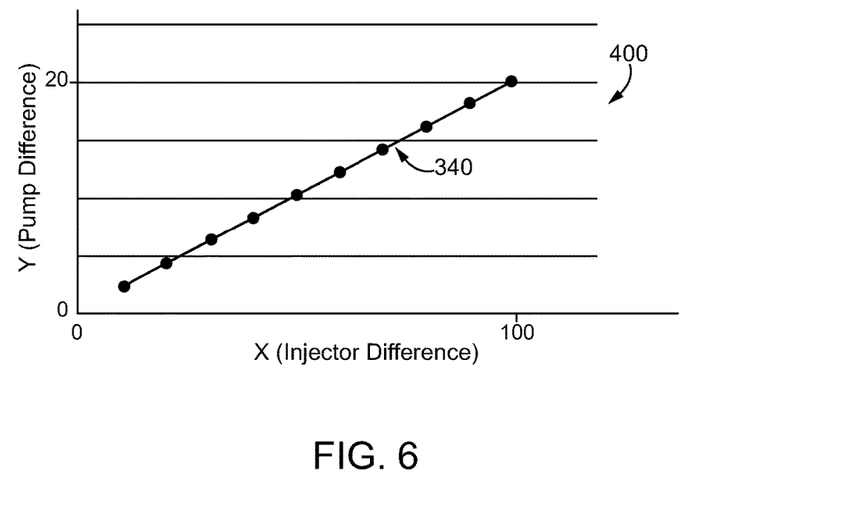
FIG. 6 is a graph illustrating pump difference in relation to injector difference and a diagnostic threshold for determining a reductant injector is obstructed.

Referring now to FIG. 5 there is shown a graphical representation 300 of map 90. May 90 may be a multi-dimensional map where a plurality of threshold values 340 are stored at locations determined by a threshold value coordinate 320, a reductant temperature coordinate 310, and an injector difference coordinate 330. As further discussed herein, electronic control unit 52 may receive reductant temperature data, calculate an injector difference, and look up a threshold value for comparison with a calculated diagnostic value to detect an obstructed condition of reductant injector 46. The subject threshold value could be expected to be positively correlated with injector difference, and negatively correlated with reductant temperature. FIG. 6 illustrates threshold values 340 plotted on a graph of pump difference in comparison with injector difference. Definitions of the various terms, and implementation of the relationships and principles set forth in FIG. 5 and FIG. 6 are discussed in greater detail hereinbelow.

INDUSTRIAL APPLICABILITY

Figures 3, 4:
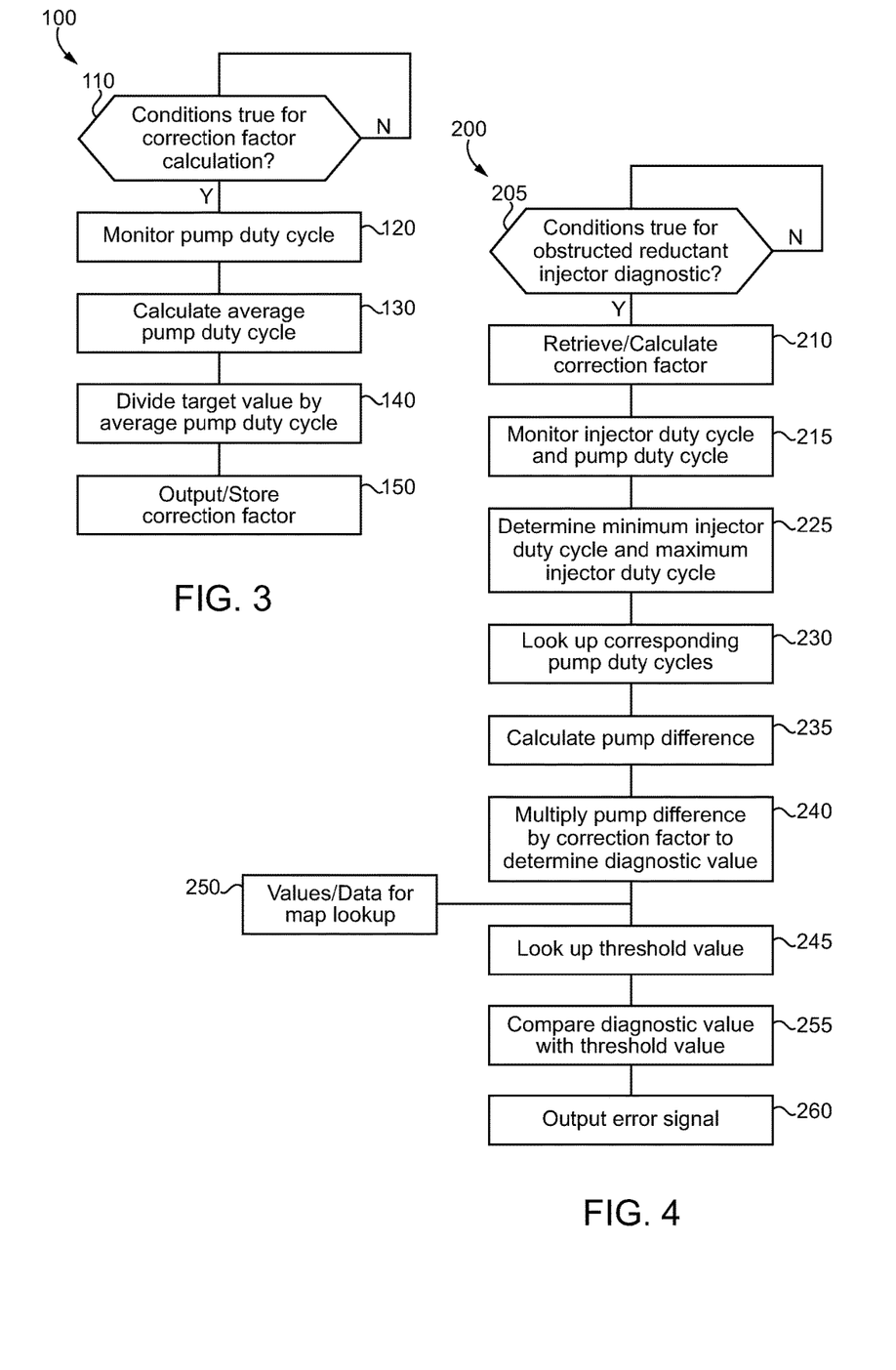
FIG. 3 is a flowchart illustrating example control logic flow, according to one embodiment.
FIG. 4 is another flowchart illustrating example control logic flow, according to one embodiment.

Referring also now to FIG. 4, there is shown a flowchart 200 illustrating example control logic flow according to the present disclosure. At a block 205, electronic control unit 52 can query are conditions true for obstructed reductant injector diagnostic? If no, the logic could loop back or exit, for example. If yes, the logic can advance to block 210 to retrieve or calculate a correction factor as discussed herein. From block 210, the logic can advance to block 215 to monitor injector duty cycle and pump duty cycle. In an implementation, injector duty cycle and pump duty cycle are monitored for a plurality of monitoring periods, with data indicative of a pump duty cycle and data indicative of an injector duty cycle received and stored for each of the plurality of monitoring periods. In a further implementation, the data indicative of pump duty cycle of pump 44 includes an average pump duty cycle and the data indicative of injector duty cycle of reductant injector 46 includes an average injector duty cycle, in each of the plurality of monitoring periods. The average pump duty cycle can include a mean pump duty cycle, and the average injector duty cycle can include a mean injector duty cycle. Accordingly, for each one of the plurality of monitoring periods numerical means corresponding to a mean percentage of time pump 44 is on and a mean percentage of time reductant injector 46 is on can be stored. In other implementations, a different measure of central tendency than the mean might be used, potentially a median, a mode, or some other measure. Electronic control unit 52 can therefore be understood to gather data in a plurality of monitoring or sampling periods and calculate the mean duty cycle for each of those monitoring periods. The monitoring periods might be about 10 seconds in duration or less, and a number of the plurality of monitoring periods might be a few dozen, such as about 50 or less, for example.

From block 215 the logic may advance to block 225 to determine a minimum injector duty cycle and a maximum injector duty cycle from among the plurality of monitoring periods. At block 225 the logic can be understood as determining which of the plurality of monitoring periods is associated with a minimum reductant injection amount as indicated by the relative proportion of time that reductant injector 46 is activated. The maximum injector duty cycle is determined analogously. It should be appreciated that the minimum injector duty cycle and the maximum injector duty cycle represent a relative minimum and a relative maximum, as the available dataset may be only that dataset from the plurality of monitoring periods. From block 225 the logic can advance to block 230 to look up the corresponding pump duty cycles. At this point the logic can be understood to determine which pump duty cycles correspond to the minimum injector duty cycle and the maximum injector duty cycle. From block 230 the logic can advance to block 235.

At block 235 the logic will calculate a pump difference. The pump difference can include a numerical value that is determined by subtracting the pump duty cycle for the one of the plurality of monitoring periods associated with the minimum injector duty cycle from the pump duty cycle for the one of the plurality of monitoring periods associated with the maximum injector duty cycle. It should also be appreciated that rather than a minimum injector duty cycle and a maximum injector duty cycle strictly defining which pump duty cycles will be used to calculate the pump difference, in other instances injector duty cycles associated with a first amount of reductant injected and a second amount of reductant injected might produce the pump duty cycle data of interest. Stated another way, calculation of the pump difference can include calculating a difference of pump duty cycle between a first one of a plurality of monitoring periods where a first amount of reductant is injected, and a second one of a plurality of monitoring periods where a second amount of reductant is injected. It should still further be appreciated that the pump difference can include a difference calculated by subtracting an average pump duty cycle in the first one of the plurality of monitoring periods from the average pump duty cycle in the second one of the plurality of monitoring periods. Analogous to the injector duty cycle data, a mean pump duty cycle or still another measure of central tendency can be used.

From block 235 the logic can advance to block 240 to multiply the pump difference by the correction factor to determine a diagnostic value. From block 240 the logic can advance to block 245 to look up a threshold value. At block 250 values and/or data for a map lookup are read or calculated. In a further implementation, the threshold value can be looked up in a multi-dimensional map such as map 90 discussed above, having a reductant temperature coordinate and an injector duty cycle coordinate. It will be recalled that electronic control unit 52 receives data indicative of a temperature of reductant from sensor 50. The injector duty cycle coordinate can include an injector difference such as can be calculated by subtracting the minimum injector duty cycle from the maximum injector duty cycle. It will be further recalled that viscosity of reductant can vary with temperature and thus pump duty cycle can be negatively correlated with reductant temperature.

From block 245, with the threshold value determined and the diagnostic value determined, the logic can advance to block 255 to compare the diagnostic value with the threshold value. From block 255 the logic can advance to block 260 to output an error signal. The error signal can be indicative of obstruction of reductant injector 46. One case where the comparison of the diagnostic value with the threshold value results in outputting the error signal is where the diagnostic value, which can also be understood as a compensated pump difference, is less than the threshold value. In reference to the FIG. 6 illustration, a diagnostic value below the threshold curve defined by values 340 could be interpreted as a fault condition. Where the diagnostic value is less than the threshold value it can be concluded that pump 44 is operating with a duty cycle that is less than what would be expected for a healthy system where reductant injector 46 is not obstructed. If the diagnostic value is equal to or greater than the threshold value, for example above the curve in FIG. 6, then it could be concluded that the pump duty cycle was close enough to what is expected that no error or fault exists. Certain other conditions could result in the logic exiting or looping back, such as where the injector difference is less than a target amount, for example about 10% or less.

It is further contemplated that action might be taken in response to the error signal, or the error signal could simply be logged for later evaluation and/or servicing. In one implementation, the logic illustrated in FIG. 4, or different control logic such as that represented by mitigation module 88, could trigger an obstructed-injector mitigation action in response to the error signal. The triggering of such an action could include commanding initiating at least one of a thermal management routine in engine 12 that feeds exhaust to exhaust conduit 41, or a high-flow routine in reductant injector 46, for example. Engine 12 could be operated to produce exhaust hot enough to ameliorate or eliminate the obstruction, reductant injector 46 could be opened for a relatively long duration of time to allow excess reductant to flow out, or still another action could be taken.

Referring now to FIG. 3, there is shown a flowchart 100 illustrating control logic flow that can be used in the calculation of the correction factor. The correction factor could include a numerical multiplier, for example, by which the raw pump difference is multiplied to compensate for pump wear and/or filter loading. At a block 110, it can be queried are conditions true for correction factor calculation? If no, the logic can loop back or exit. If yes, the logic can advance to block 120 to monitor the pump duty cycle. It is contemplated that conditions that must be true for correction factor calculation can include detection of a zero state of the reductant injector duty cycle, as operation of reductant injector 46 that is simultaneous or overlapping with operation of pump 44 could be expected to potentially compromise the validity or reliability of pump duty cycle data in evaluating pump performance with respect to these factors of pump wear and/or filter loading. Pump duty cycle may be monitored at block 120, and the logic can advance to block 130 to calculate the average pump duty cycle based on pump duty cycle data received, such as the mean pump duty cycle. From block 130 the logic can advance to block 140 to divide a target value by the average pump duty cycle, in other words calculating a quotient of the target value and the average pump duty cycle. The target value could be a numerical value, such as a percentage of time that the pump could be expected to be turned on when the reductant injector is not operating. It will thus be appreciated that the correction factor when calculated in this manner will typically have a value greater than 1. From block 140, the logic can advance to block 150 to output or store the calculated correction factor for use in executing the obstructed-injector diagnostic logic contemplated herein. The correction factor could be calculated every time the diagnostic logic is to run. In other instances, the correction could be calculated periodically over the course of a service life of reductant delivery system 42, when conditions are detected that are suitable for calculation of the correction factor, or at times determined on the basis of some other factor(s).

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A reductant delivery system for treating emissions in an engine exhaust system comprising:
   an electronically controlled reductant injector structured for coupling with an exhaust conduit in the exhaust system;
   an electronically controlled pump coupled with the electronically controlled reductant injector;
   an electronic control unit coupled with each of the electronically controlled reductant injector and the electronically controlled pump; the electronic control unit being structured to:
      receive data indicative of a pump duty cycle of the electronically controlled pump in each of a plurality of monitoring periods;
      determine that a relative maximum amount of the reductant is injected in a first one of the plurality of monitoring periods and that a relative minimum amount of the reductant is injected in a second one of the plurality of monitoring periods;
      calculate a diagnostic value based on a difference between the pump duty cycle in the first one of the plurality of monitoring periods, and the pump duty cycle in the second one of the plurality of monitoring periods;
      compare the diagnostic value with a threshold value; and
      produce an error signal indicative of obstruction of the reductant injector based on the comparing of the diagnostic value with the threshold value; and
      trigger an obstructed-injector mitigation action in response to the error signal.

2. The system of claim 1 wherein the data indicative of a pump duty cycle of the electronically controlled pump includes an average pump duty cycle, and the electronic control unit is further structured to receive data indicative of an average injector duty cycle of the electronically controlled reductant injector, in each of the plurality of monitoring periods.

3. The system of claim 2 wherein the average pump duty cycle includes a mean pump duty cycle, and the average injector duty cycle includes a mean injector duty cycle.

4. The system of claim 2 wherein the electronic control unit is further structured to determine the first one of the plurality of monitoring periods and the second one of the plurality of monitoring periods based on the data indicative of an average injector duty cycle.

5. The system of claim 2 wherein the electronic control unit is further structured to subtract the average pump duty cycle in the first one of the plurality of monitoring periods from the average pump duty cycle in the second one of the plurality of monitoring periods.

6. The system of claim 5 wherein the electronic control unit is further structured to calculate a correction factor to compensate for at least one of pump wear or filter loading, and to calculate the diagnostic value based on the correction factor.

7. The system of claim 6 wherein the electronic control unit is further structured to detect a zero state of the injector duty cycle, and calculate the correction factor based on an average pump duty cycle during the zero state of the injector duty cycle.

8. The system of claim 6 wherein the correction factor includes a multiplier, and the electronic control unit is further structured to calculate the correction factor by calculating the quotient of the average pump duty cycle and a target value.

9. The system of claim 1 wherein the electronic control unit is further structured to determine the threshold value based on a tank temperature of a reductant tank in the reductant delivery system.

10. The system of claim 1 wherein the electronic control unit is further structured to command a change in operation of at least one of the reductant injector or an internal combustion engine feeding exhaust to an exhaust conduit receiving the reductant injector, based on the error signal.

11. A method of mitigating obstruction of a reductant injector in an exhaust system of an internal combustion engine, the method comprising:
monitoring a duty cycle of a reductant injector structured to couple with an exhaust conduit in the exhaust system;
monitoring a duty cycle of a pump operated to supply a reductant to the reductant injector in a plurality of monitoring periods;
determining that a relative maximum amount of the reductant is injected in a first one of the plurality of monitoring periods and that a relative minimum amount of the reductant is injected in a second one of the plurality of monitoring periods;
calculating a diagnostic value based on a difference between a duty cycle of the pump in the first one of a plurality of monitoring periods, and a duty cycle of the pump in the second one of the plurality of monitoring periods;
producing an error signal based on the diagnostic value; and
triggering an obstructed-injector mitigation action in response to the error signal.

12. The method of claim 11 wherein the triggering of an obstructed-injector mitigation action includes commanding initiating at least one of a thermal management routine in an internal combustion engine feeding exhaust to the exhaust conduit or a high-flow routine in the reductant injector.

13. The method of claim 11 further comprising calculating a correction factor that is based on at least one of pump wear or filter loading, and calculating the diagnostic value based on the correction factor.

14. The method of claim 13 wherein the duty cycle of the pump in the first one of the plurality of monitoring periods and the duty cycle of the pump in the second one of the plurality of monitoring periods each includes an average duty cycle.

15. The method of claim 14 further comprising multiplying a difference between the average duty cycle in the first one of the plurality of monitoring periods and the average duty cycle in the second one of the plurality of monitoring periods by the correction factor.

16. The method of claim 15 further comprising comparing the diagnostic value to a threshold value, and outputting the error signal based on the comparing of the diagnostic value to a threshold value.

17. The method of claim 16 further comprising looking up the threshold value in a multi-dimensional map having a reductant temperature coordinate, and an injector duty cycle coordinate corresponding to a difference in duty cycle of the reductant injector between the first one of the plurality of monitoring periods and the second one of the plurality of monitoring periods.

18. An exhaust system for an internal combustion engine comprising:
a reductant tank;
an exhaust conduit;
an electronically controlled reductant injector structured for coupling with the exhaust conduit;
an electronically controlled pump structured to supply a reductant from the reductant tank to the electronically controlled reductant injector;
an electronic control unit coupled with each of the electronically controlled reductant injector and the electronically controlled pump, the electronic control unit being structured to:
receive data indicative of a duty cycle of the electronically controlled reductant injector, and data indicative of a duty cycle of the electronically controlled pump;
determine each of a maximum duty cycle of the electronically controlled reductant injector and a minimum duty cycle of the electronically controlled reductant injector from among the plurality of monitoring periods;
calculate a diagnostic value based on a difference between a duty cycle of the electronically controlled pump in a first one of a plurality of monitoring periods corresponding to the determined maximum duty cycle, and a duty cycle of the electronically controlled pump in a second one of the plurality of monitoring periods corresponding to the determined minimum duty cycle:
compare the diagnostic value with a threshold value;
produce an error signal based on the comparing of the diagnostic value with a threshold value; and
trigger an obstructed-injector mitigation action in response to the error signal.

19. The system of claim 18 further comprising a temperature sensor coupled with the reductant tank, and wherein the electronic control unit is further structured to receive data produced by the temperature sensor that is indicative of a temperature of reductant within the reductant tank, and determine the threshold value based on the data produced by the temperature sensor.

* * * * *